(12) United States Patent
Lin et al.

(10) Patent No.: US 7,973,983 B2
(45) Date of Patent: Jul. 5, 2011

(54) LIGHT GUIDE DEVICE AND ILLUMINATION MODULE USING THE SAME

(75) Inventors: Hsien-Chi Lin, Taichung (TW);
Heng-Hsiang Chang, Taichung (TW);
Wen-Lang Hung, Taichung (TW);
Kung-Hsin Teng, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 921 days.

(21) Appl. No.: 11/924,900

(22) Filed: Oct. 26, 2007

(65) Prior Publication Data
US 2008/0291514 A1 Nov. 27, 2008

(30) Foreign Application Priority Data

May 22, 2007 (TW) ................................ 96118133 A

(51) Int. Cl.
*H04N 1/04* (2006.01)
(52) U.S. Cl. .................... 358/484; 358/475; 358/483
(58) Field of Classification Search .................. 358/484, 358/475, 483, 482, 497, 474, 509, 512–514, 358/505; 250/227.11, 227.26, 208.1, 239, 250/234–236, 216; 399/211, 212, 220, 221; 355/67, 68; 362/551, 615, 555, 560
See application file for complete search history.

(56) References Cited

U.S. PATENT DOCUMENTS

| | | | |
|---|---|---|---|
| 6,177,667 B1 * | 1/2001 | Fujita et al. | 250/216 |
| 7,548,352 B2 * | 6/2009 | Sakurai et al. | 358/475 |
| 7,760,403 B2 * | 7/2010 | Sakurai | 358/484 |
| 2009/0080038 A1 * | 3/2009 | Hayashide et al. | 358/475 |
| 2009/0237750 A1 * | 9/2009 | Tatsuno et al. | 358/475 |
| 2009/0251741 A1 * | 10/2009 | Sheng et al. | 358/475 |

* cited by examiner

*Primary Examiner* — Cheukfan Lee
(74) *Attorney, Agent, or Firm* — Thomas | Kayden

(57) ABSTRACT

An illumination module is provided in the invention. The illumination module includes a light source having a plurality of light emitting elements arranged in a linear array and a light guide device. The light guide device receives light from the light source and generates uniform light which is transmitted onto an article to be scanned, has a longitudinal direction, and includes a diffraction structure and a reflection portion. The diffraction structure has a shape inducing light to be scattered and deflects the scattered light toward the longitudinal direction. The reflection portion reflects the light scattered and deflected by the diffraction structure, and is inclined to have an inclined angle with the light propagating direction. In addition, the reflection portion is formed on the diffraction structure or apart from it.

16 Claims, 6 Drawing Sheets

LIGHT GUIDE DEVICE AND ILLUMINATION MODULE USING THE SAME

BACKGROUND OF THE INVENTION

1. Field of the Invention

The invention relates to a light guide device, and more particularly to an illumination module using the light guide device suitable for installation in a scanning apparatus, a multifunction peripheral, a facsimile machine or the like.

2. Description of the Related Art

The light source utilized in a conventional scanning device is a cold cathode fluorescent lamp (CCFL). Before a scanning action begins, it is necessary to warm up the CCFL until the illumination of the CCFL attains a steady state. The life span of the CCFL is about ten thousand hours, which places limitations on usage time. The CCFL also has relatively lower illumination efficiency and larger heat dissipation during illumination. Additionally, CCFL power consumption is relatively high. Thus, there are many drawbacks for using the cold cathode fluorescent lamp as the light source.

As shown in FIG. 1, a conventional scanning device 1 incorporating the light-emitting diode (LED) includes a body 11, a transparent plate 12, a light module 13, a reflecting module 14, and an image capturing element 15. The body 11 further has a chamber 111 for reflecting, and the reflecting module 14 is installed therein. The transparent plate 12 is above the body 11, and the light module 13 is located on the body 11 and disposed between the transparent plate 12 and the body 11. The light module 13 has a plurality of LEDs 131 arranged in a linear array and a cylindrical lens 132 sheltering the LEDs 131. The cylindrical lens 132 has a receiving surface 133 adjacent to the LEDs 131 and an emitting surface 134, wherein the emitting surface 134 has a radius curvature. The light emitted from the LEDs 131 of the light module 13 will enter the cylindrical lens 132 via receiving surface 133, and then be transmitted onto an article 16 located on the transparent plate 12 after passing through the emitting surface 134 and the transparent plate 12 in sequence. Moreover, the light is reflected into the chamber 111 by the article 16, and then the light is received and transformed into electronic signals by the image capturing element 15 after reflecting the light by the reflecting module 14.

However, the conventional scanning device 1 has a disadvantage where the intensity of the light module 13 is not uniform. In conventional scanning device 1, each LEDs 131, as a light point, is arranged apart from each other. Thus, uniform illumination for incident light can not be achieved, even if illumination is increased by the light source.

BRIEF SUMMARY OF THE INVENTION

The invention provides a light guide, which uniforms light from a plurality of LEDs arranged in a linear array and then transmits the uniformed light onto an article.

The invention provides an illumination module with a light guide device, which uniforms light to be transmitted onto an article.

The illumination module includes a light guide device and a light source having a plurality of LEDs arranged in a linear array. The light guide device has a receiving portion, a diffraction portion, an emitting portion, and a reflection element. The longitudinal direction of the receiving portion is approximately parallel to arrangement direction of the LEDs. The receiving portion receives the light emitted from the LEDs, and then the light enters the light guide device. The diffraction portion has a plurality of micro-structures, and the longitudinal direction of the diffraction portion is approximately parallel to arrangement direction of the LEDs. The contour of the micro-structures formed on the diffraction portion could be regular or irregular. The reflection element is formed on or formed above the diffraction portion; both aspects can reflect the scattered light to the emitting portion.

The invention has an advantage of uniforming the light to be transmitted onto an article by scattering the light from a plurality of light emitting elements arranged in a linear array by a diffraction portion of a light guide device, wherein the longitudinal direction of the diffraction portion is approximately parallel to arrangement direction of the light emitting elements.

In the invention, as the reflection element is formed on the diffraction portion, the diffraction portion can scatter the light once and reflect the scattered light to an article to be scanned. As the reflection element is disposed apart from the diffraction portion, the diffraction portion will scatter the light first when the light passes through the diffraction portion and then scatter the scattered light again as the scattered light is reflected back by the reflection element. Thus, the invention has a feature of scattering the light to be transmitted onto an article at least once.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
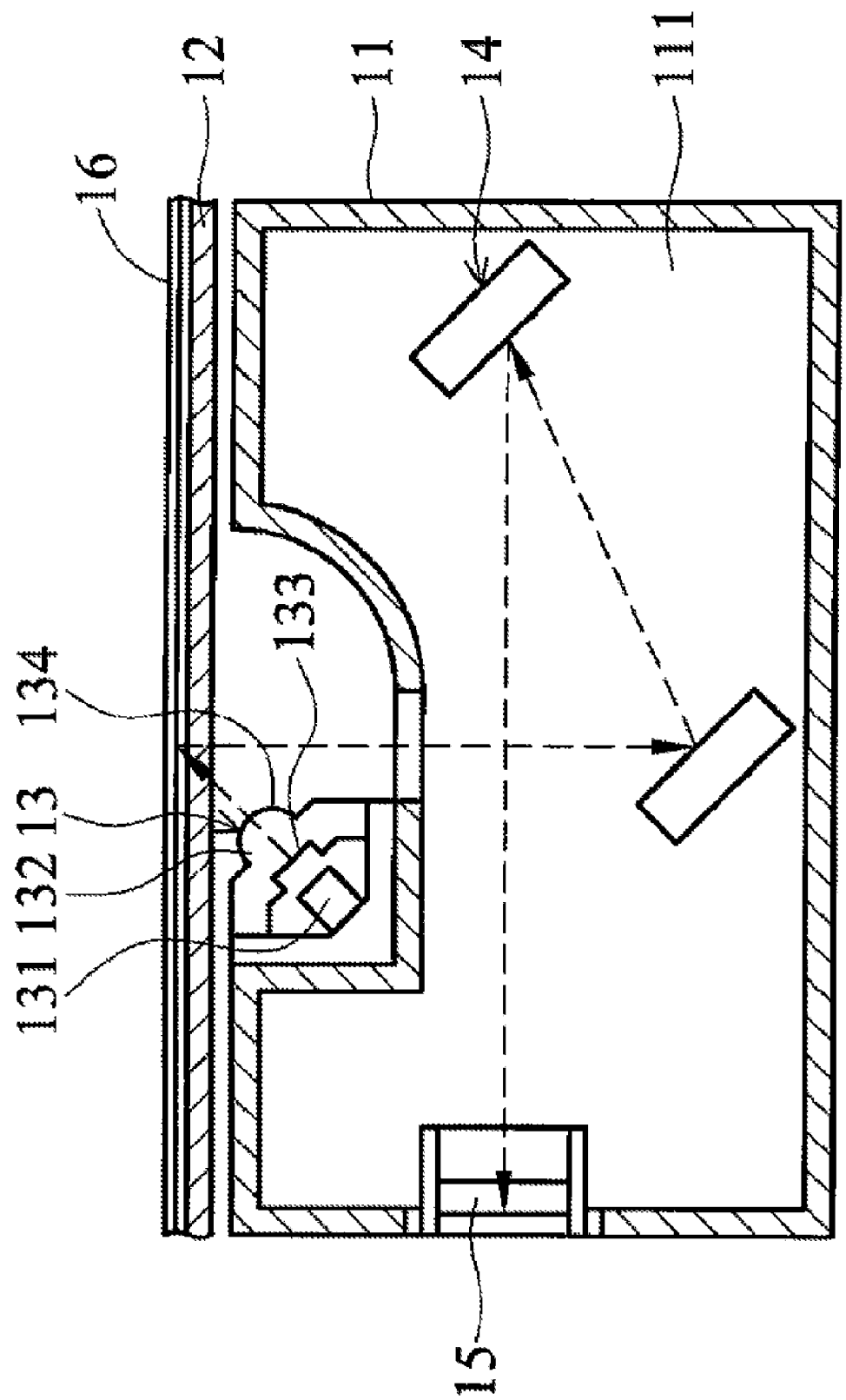
FIG. 1 is a schematic view of a conventional scanning apparatus using LEDs as a light source.
Figure 2:
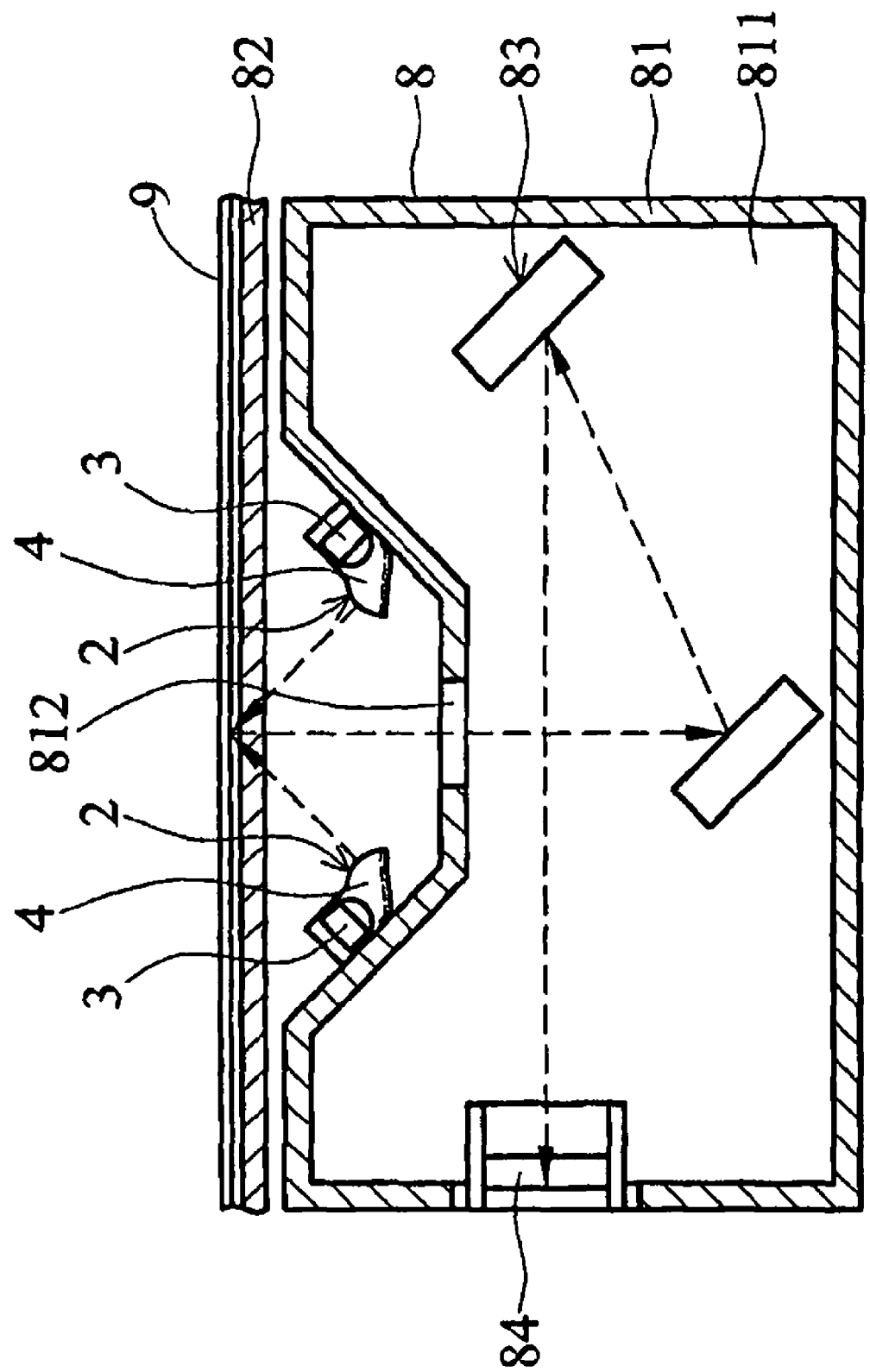
FIG. 2 is a lateral view of a first embodiment of the invention showing an illumination module incorporating a light guide device.
Figure 3:
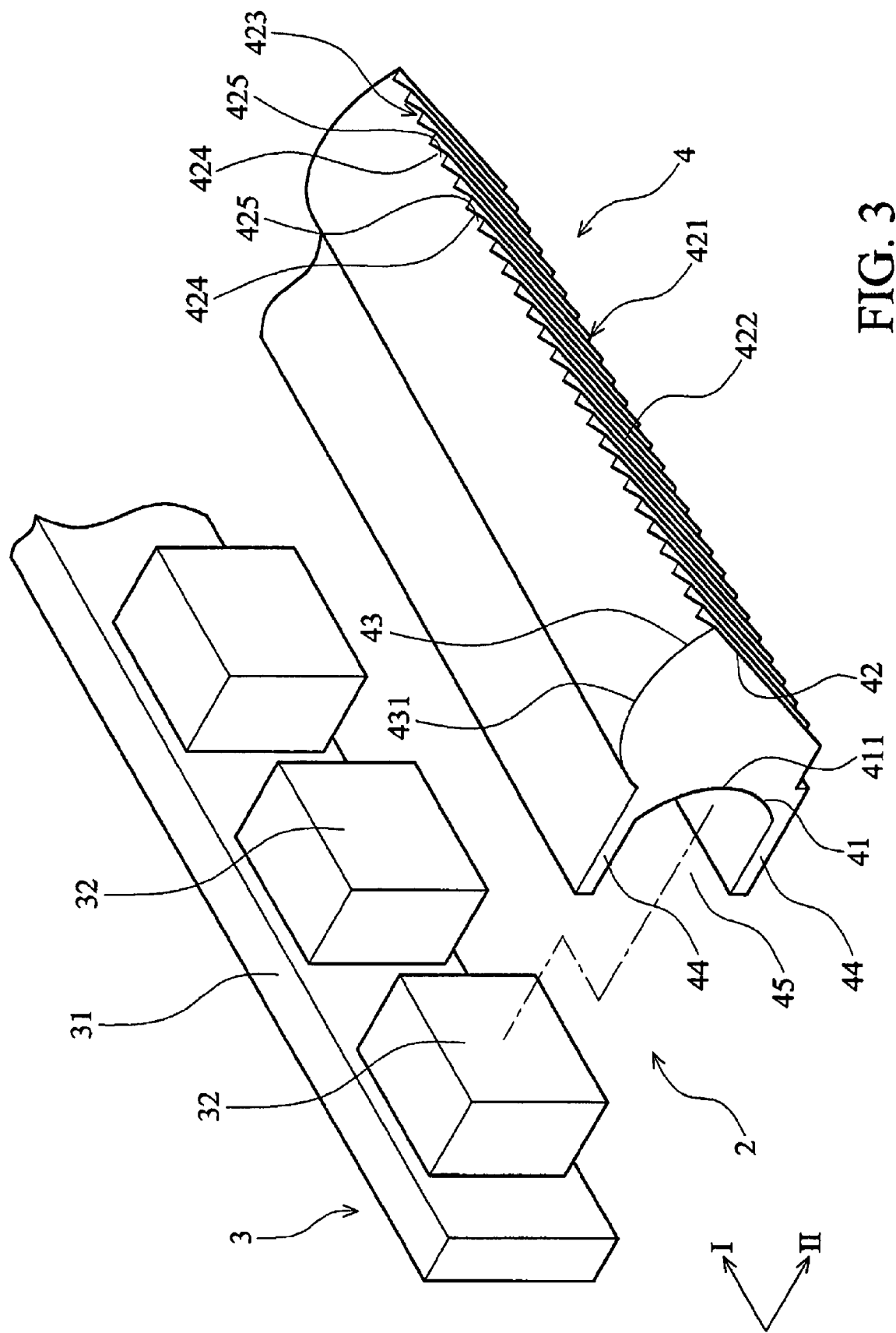
FIG. 3 is an explosion diagram of the first embodiment of the invention.

In FIG. 2 and FIG. 3, the first embodiment of the invention shows an illumination module 2 incorporating a light guide device 4, and the illumination module 2 is installed in a scanning apparatus 8. The scanning apparatus 8 has a case 81 forming a chamber 811, and the case 81 has an opening 812. A transparent plate 82 is mounted on the case 81 to support an article 9 to be scanned. A reflection module 83 for folding the light which is reflected from the article 9 and passed through the opening 812 is disposed in the chamber 811. An image capturing element 84 is disposed in the case 81, and receives the light from the reflection module 83. In the first embodiment, the opening 812 is a slit, and two illumination modules 2 are respectively disposed along the sides of the slit and located between the case 81 and the transparent plate 82. Each illumination module 2 has a light source 3 and a light guide device 4.

The light source 3 includes a circuit board 31 having a longitudinal direction I parallel to the slit. A plurality of LEDs 32 are mounted on the circuit board 31 and arranged in a linear array parallel to the longitudinal direction I.

The light guide device 4 includes a receiving portion 41, a reflection portion 42, an emitting portion 43 and two supporting portions 44. The longitudinal directions of the receiving portion 41, reflection portion 42 and emitting portion 43 are parallel to the longitudinal direction I. One supporting portion 44 extends from the border between the receiving portion 41 and the emitting portion 43, and the other supporting portion 44 extends from the border between the receiving portion 41 and the reflection portion 42. Thus, the two supporting portions 44 and the receiving portion 41 form a U-shaped cave 45, with the cave 45 containing the light source 3.

Figure 4:
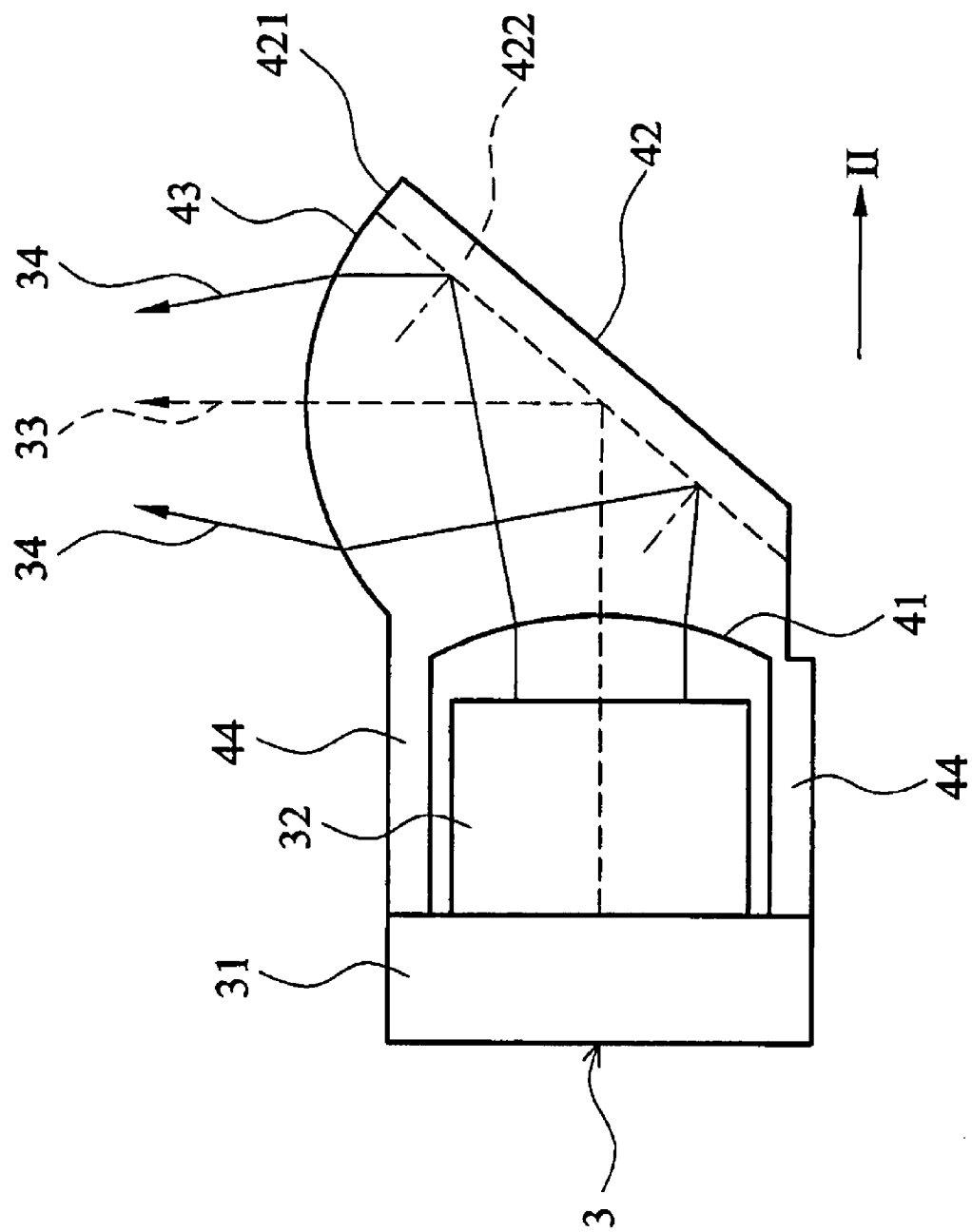
FIG. 4 is a cross-section of the first embodiment of the invention showing the ray tracing.

In FIG. 4, a cross-section of the illumination module of the invention is shown. The receiving portion 41 has a surface formed in the shape of a cylinder and has a radius curvature 411. A diffraction structure 421 is formed on the reflection portion 42, wherein the diffraction structure 421 is a plurality of V-shaped protruding structures 423. In this embodiment, the interval between the two adjacent tips 425 of V-shaped protruding structures 423 is 1 mm, and the height of each tip 425 measured from the bottom of V-shaped protruding structure 423 is 1 mm. The reflection portion 42 is a reflective film 422 coated on the diffraction structure 421. The reflective film 422 can be a silver film, aluminum film or any film having high reflectivity. Thus, the light entering the light guide device 4 via the receiving portion 41 will be scattered by the diffraction structure 421 once, because the scattered light will be reflected by the reflective film 422. The V-shaped protruding structure 423 can be replaced by one of the groups consisting of pyramidal structures, fresnel lens structures, lenticular lens structures, cone structures and any shape that can induce light to be scattered. Additionally, the arrangement or dimension of the structures mentioned above can be regular or irregular.

Referring to FIGS. 3 and 4, each LEDs 32 of the light source 3 is located in the cave 45, and enclosed by the receiving portion 41 and the two supporting portions 44. The light emitted from each LEDs 32 is transmitted onto the receiving portion 41. The receiving portion 41 receives the light, and then the light is transmitted onto the diffraction structure 421. The light from the receiving portion 41 is scattered by the diffraction structure 421. Before scattering light, the light emitted from the light source 3 propagates along the direction II which is perpendicular to the direction I. As the light is transmitted onto the diffraction structure 421, the diffraction structure 421 scatters the light and changes its propagating direction. For example, as the light is transmitted onto the V-shaped protruding structures 423 mentioned above, the two inclined sidewall of each V-shaped protruding structures 423 reflect the light and then the light can be propagated along other directions, wherein the light can spread along the direction I. By scattering the light and changing the propagating direction of the light, the diffraction portion 421 re-distributes light intensity. Next, the light is reflected by the reflective film 422 coated on the diffraction structure 421 and propagates toward the emitting portion 43. After emitting from the emitting portion 43, the light guide device 4 provides uniform illumination onto the article 9 on the transparent plate 82.

Figure 5:
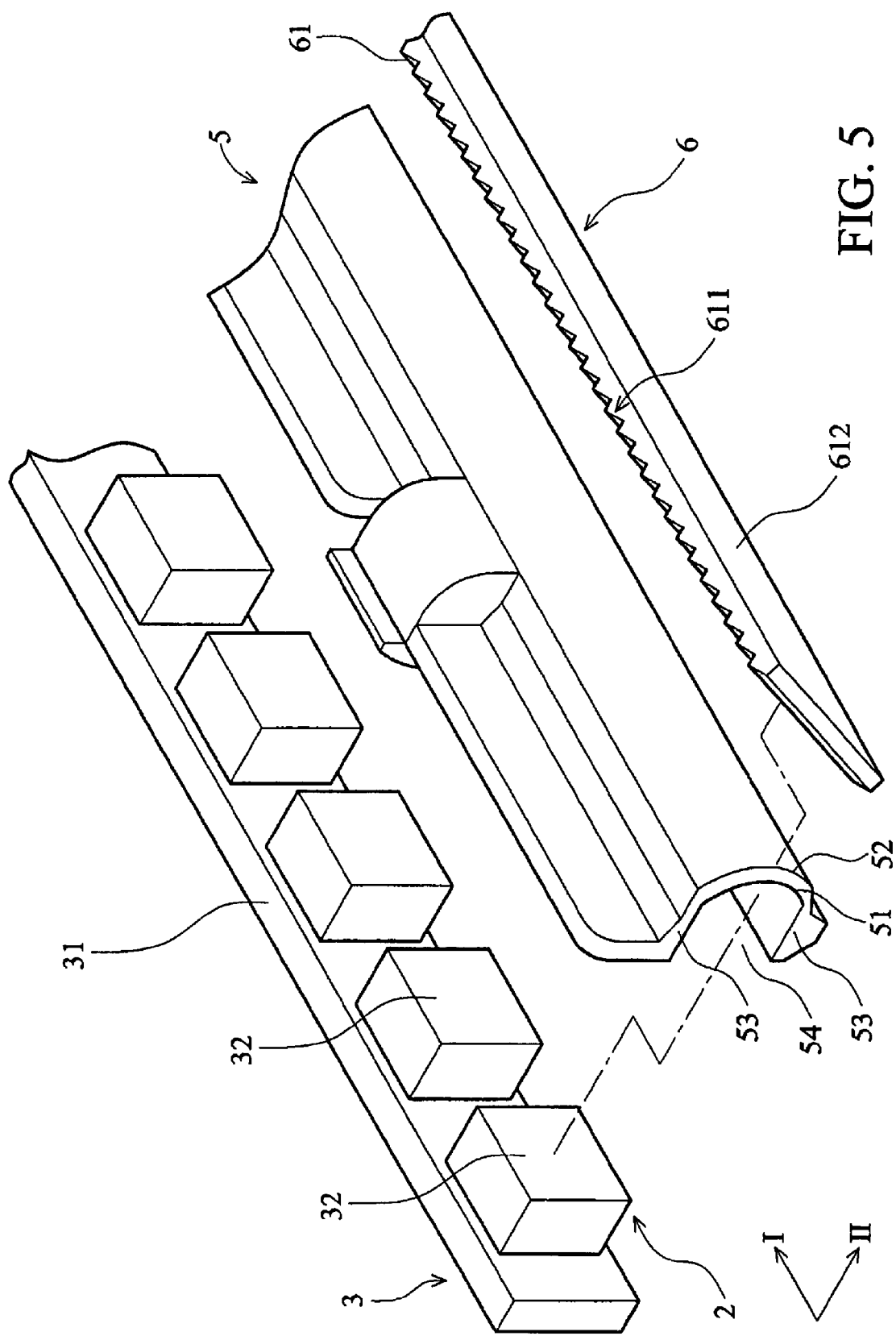
FIG. 5 is an explosion diagram of a second embodiment of the invention showing an illumination module incorporating a light guide device.

In FIG. 5, the second embodiment of the invention shows an illumination module 2 incorporating a light guide device, wherein the illumination module 2 is installed in a scanning apparatus. The light guide device includes a receiving portion 5, a reflection portion 6 and two supporting portions 53. The longitudinal directions of the receiving portion 5 and reflection portion 6 are parallel to the longitudinal direction I. One supporting portion 53 extends from one edge of the receiving portion 41, and the other supporting portion 53 extends from the other edge of the receiving portion 41. Thus, the two supporting portions 53 and the receiving portion 5 form a U-shaped cave 54, with the cave 45 containing the light source 3. In the second embodiment, the reflection portion 6 and the receiving portion 5 are not integrated. A diffraction structure 61 is formed on the reflection portion 6, wherein the diffraction structure 61 is a plurality of V-shaped protruding structures 611. In addition, a reflective film 612 is disposed opposite to the diffraction structure 61 and apart from the diffraction structure 61. Because the reflective film 612 is apart from the diffraction structure 61, the light emitted from the light source 3 and passed through the receiving portion 5 will be scattered by the diffraction structure 61 at least twice. Specifically, the diffraction structure 61 refracts the light and deflects the light toward the direction I, and then the reflective film 612 reflects the light back to the diffraction structure 61 and the diffraction structure 61 refracts and deflects the light again. Therefore, the diffraction structure 61 provides uniform illumination onto the article 9 on the transparent plate 82.

Figure 6:
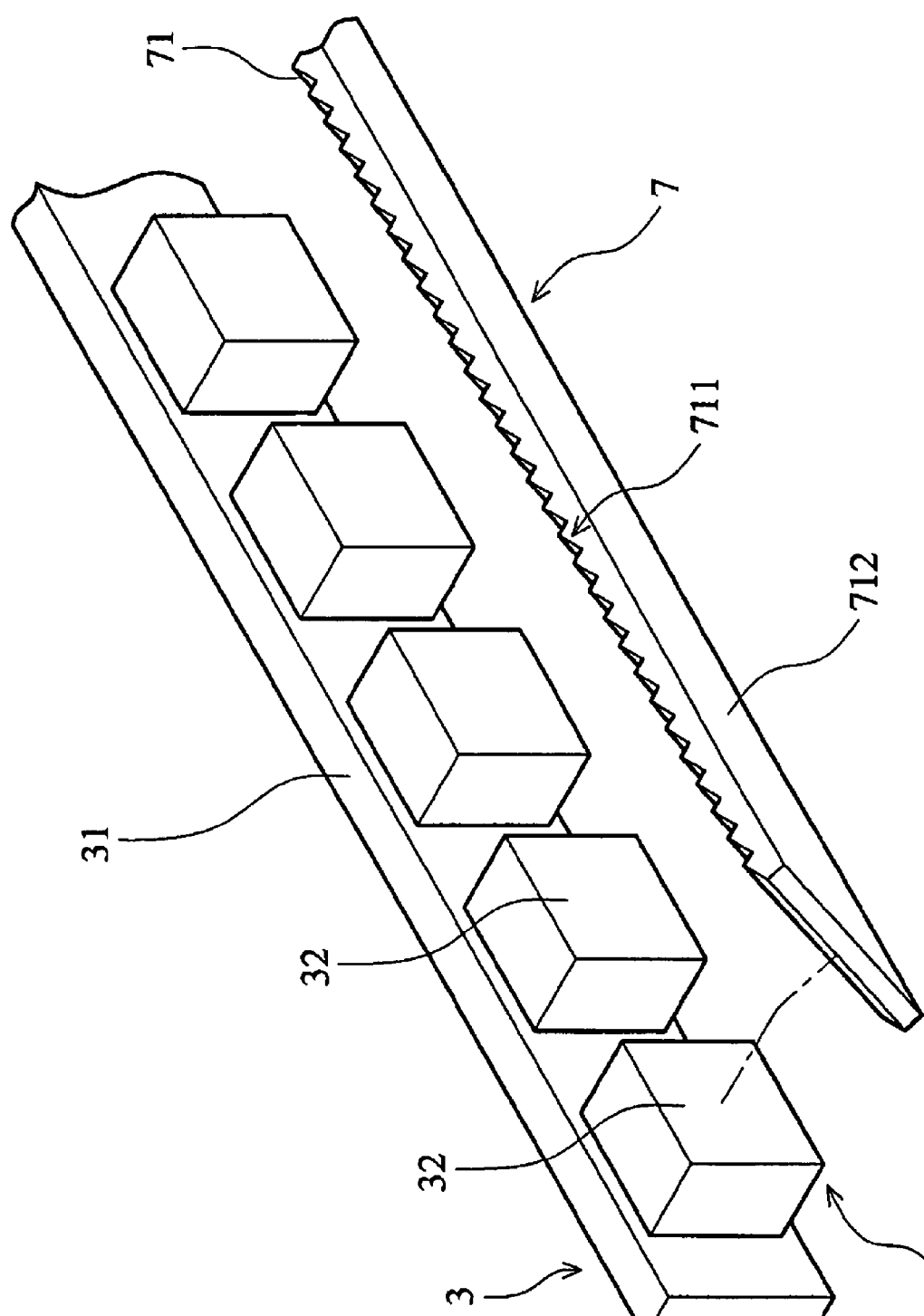
FIG. 6 is an explosion diagram of a third embodiment of the invention showing an illumination module incorporating a light guide device.

In FIG. 6, the third embodiment of the invention shows an illumination module 2 incorporating a light guide device, wherein the illumination module 2 is installed in a scanning apparatus. In this embodiment, the light guide device only has a reflection portion 7. The longitudinal direction of the reflection portion 7 is parallel to the longitudinal direction I. A diffraction structure 71 is formed on the reflection portion 7, wherein the diffraction structure 71 is a plurality of V-shaped protruding structures 711. In addition, a reflective film 712 is disposed opposite to the diffraction structure 71 and apart from the diffraction structure 71. Because the reflective film 712 is apart from the diffraction structure 71, the light emitted from the light source 3 will be scattered by the diffraction structure 71 at least twice. Specifically, the diffraction structure 71 refracts the light and deflects it toward the direction I, and then the reflective film 712 reflects the light back to the diffraction structure 71 and the diffraction structure 71 refracts and deflects the light again. Therefore, the diffraction structure 71 provides a uniform illumination onto the article 9 on the transparent plate 82.

In the invention, the reflection portion is inclined to have an inclined angle with the direction II. The reflective film can be formed on the diffraction structure or apart from the diffraction structure. As the reflective film is coated on the diffraction structure, the diffraction structure will scatter the light once. As the reflective film is disposed apart from the diffraction structure, the diffraction will scatter the light at least twice. The diffraction structure will change the light propagating direction and make the illumination module emit uniform light intensity.

In addition, the receiving portion and emitting portion reflective film 422 can have a surface formed in the shape of cylinder, with a radius curvature. Thus, the shape of cylinder will modify the shape of the light, and then the illumination module will emit a light having a bar shape.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light guide device receiving light from a light source and generating uniform light which is transmitted onto an article to be scanned, wherein the light guide device has a longitudinal direction, and the light guide device comprising:
   a diffraction structure having a shape inducing light to be scattered and deflecting the scattered light toward the longitudinal direction; and
   a reflection portion for reflecting the light scattered and deflected by the diffraction structure;
   wherein the reflection portion is inclined to have an inclined angle with the light propagating direction.

2. The light guide device as claimed in claim 1, further comprising a receiving portion having a surface formed in the shape of a cylinder with a radius curvature.

3. The light guide device as claimed in claim 2, wherein the reflection portion is integrated with the receiving portion.

4. The light guide device as claimed in claim 2, further comprising two supporting portions, wherein one supporting portion extends from the edge of one receiving portion and the other supporting portion extends from the other edge of the receiving portion.

5. The light guide device as claimed in claim 1, further comprising an emitting portion having a surface formed in the shape of a cylinder with a radius curvature.

6. The light guide device as claimed in claim 1, wherein the reflection portion is a reflective film formed on the diffraction structure.

7. The light guide device as claimed in claim 1, wherein the reflection portion is disposed apart from the diffraction structure.

8. The light guide device as claimed in claim 7, wherein the diffraction structure faces the light source.

9. An illumination module providing uniform light transmitted onto an article to be scanned, comprising:
   a light guide device as claimed in claim 1, having a longitudinal direction, comprising a diffraction structure which has a shape inducing light to be scattered and deflected toward the longitudinal direction and a reflection portion for reflecting the light scattered and deflected by the diffraction structure, wherein the reflection portion is inclined to have an inclined angle with the light propagating direction; and
   a light source, having a plurality of light emitting elements arranged in a linear array which is parallel to the longitudinal direction, and emitting light toward the light guide device.

10. The illumination module as claimed in claim 9, wherein the light guide device further comprises a receiving portion having a surface formed in the shape of a cylinder with a radius curvature.

11. The illumination module as claimed in claim 10, wherein the reflection portion is integrated with the receiving portion.

12. The illumination module as claimed in claim 10, wherein the light guide device further comprises two supporting portions, wherein one supporting portion extends from one edge of the receiving portion and the other supporting portion extends from the other edge of the receiving portion.

13. The illumination module as claimed in claim 12, wherein the two supporting portions and the receiving portion form a U-shaped cave, and the light source is installed in the cave.

14. The illumination module as claimed in claim 9, wherein the light guide device further comprises an emitting portion having a surface formed in the shape of a cylinder with a radius curvature.

15. The illumination module as claimed in claim 9, wherein the reflection portion is a reflective film formed on the diffraction structure.

16. The illumination module as claimed in claim 9, wherein the reflection portion is disposed apart from the diffraction structure.

* * * * *